United States Patent [19]
Hensley

[11] Patent Number: 6,155,964
[45] Date of Patent: Dec. 5, 2000

[54] CENTRIFUGE DRIVE SYSTEM PROVIDING OPTIMUM PERFORMANCE

[75] Inventor: Gary L. Hensley, Kingwood, Tex.

[73] Assignee: Hutchison-Hayes International, Inc., Houston, Tex.

[21] Appl. No.: 09/260,745

[22] Filed: Mar. 1, 1999

[51] Int. Cl.⁷ ....................................................... B04B 1/20
[52] U.S. Cl. ................................... 494/9; 494/53; 494/84
[58] Field of Search .................................. 494/7, 8, 9, 53, 494/54, 83, 84; 210/380.3

[56] References Cited

U.S. PATENT DOCUMENTS

| | | |
|---|---|---|
| 775,320 | 11/1904 | Van Kirk . |
| 2,734,681 | 2/1956 | Schiedel . |
| 3,282,497 | 11/1966 | Schmiedel . |

FOREIGN PATENT DOCUMENTS 1457416  12/1976  United Kingdom .

*Primary Examiner*—Matthew O. Savage
*Assistant Examiner*—David Sorkin
*Attorney, Agent, or Firm*—Felsman, Bradley, Vaden, Gunter & Dillon, L.L.P.

[57] ABSTRACT

The present conveyor system includes an external bowl with an internal screw conveyor of one or more flites which is rotated to cooperate with the bowl. The bowl and conveyor provides scrolling actions so that a mixed fluid introduced therein is segregated to separate the heavier parts from other parts in the fluid. One aspect of the disclosure is the incorporation of a single motor connected either to the bowl or conveyor, and a output power transmission connected between said bowl and conveyor. The transmission assures that the bowl and conveyor rotated in the right direction to provide the scrolling action which is maintained at as desired ratio with respect to bowl speed. In the preferred form, this includes a dual input, dual output transmission, and a connection so that only one motor source is needed.

17 Claims, 2 Drawing Sheets

CENTRIFUGE DRIVE SYSTEM PROVIDING OPTIMUM PERFORMANCE

BACKGROUND OF THE DISCLOSURE

A centrifuge of substantial size, typically one handling hundreds of gallons or more per minute, normally requires two drive mechanisms. One drive is connected to the bowl and rotates the bowl at a specified speed. Another drive is connected to the internal conveyor which is an elongate screw with one or two flites. The screw is run at a speed which is close to the bowl speed, but slightly offset from it. Depending on the lead or lag of the screw flites, and depending on the nature of the separation being accomplished in the centrifuge, the screw is operated at a few rpm difference in speed.

The power required for operation of the centrifuge is in part defined by the volume of material being rotated. Effectively, this requires calculation based on the diameter and length of the bowl which, for this calculation, is deemed to be filled to maximum capacity with the material undergoing separation. Most of these mixtures are suspensions which require separation of sediment or perhaps emulsions of oil and grease which are separated into separate water and oil phases. Whatever the circumstance, the energy required for operation is a significant factor. Moreover, for a given mode of separation, the operation of the centrifuge has to be adjusted. Sometimes, this involves increasing the rpm. When the rpm increases, the slurry undergoing separation at the outer wall is subjected to maximum gravitational pull, thereby speeding up the separation. For instance, with an emulsion of water droplets in oil or oil droplets in water, the difference in specific gravity can be quite small. Such emulsions exist because the specific gravity difference is so small that surface tension overcomes it to prevent gravity separation to the bottom. Without the assistance of a centrifuge, merely placing an emulsion in a container and waiting a long time will ordinarily not produce much separation, if any, because time only cannot overcome the surface tension that keeps the drops or bubbles floating. Accordingly, the use of a centrifuge accentuates the modest difference in specific gravity or density. If the density difference is negligible, when exposed to a centrifuge imparting a pull of 2,000 or even 3,000 g's, separation can be achieved. Obtaining that level of pull, however, requires greater performance from a centrifuge.

Centrifuge operation is not merely the concept that more power accomplishes a better separation. If, in a given situation, the centrifuge is operated at speeds imparting 3,000 g's to the slurry, then increasing that to 4,000 g's will not necessarily provide a better separation. A better separation is not necessarily obtained by increasing the rate at which the screw conveyor removes the separated particles in the bowl. There are interlocking difficulties with regard to all of these operations. More than that, there are capital costs of equipment for the implementation of such controls to the end that better separation is normally obtained with a dual motor setup. Elaborating, a large motor is necessary to rotate the bowl. Assume for purposes of description that the large motor is a 100-horsepower motor. A smaller motor, perhaps 40-horsepower, is required to operate the conveyor. An elaborate control system between the two motors is necessary to operate them at the selected speed differential. That setup might provide the optimum separation, but it describes the more costly of structures and is remarkably complex in the sense that two separate motors must be controlled and the operation of the two must be correlated. For instance, when the conveyor is off, switching on the bowl motor must be timed with respect to switching on the conveyor motor, and they must come up at related speeds as they approach the normal operating speeds required for them. Otherwise, the beginning moment will involve a defective separation, i.e. a separation which does not accomplish the intended purpose, and all the product through the machine at that startup circumstance will not meet the desired specifications.

It is not uncommon for a large centrifuge of the type just mentioned to cost $200,000 to $400,000 in 1998 prices. The power consumption of the two separate motors is quite large. When installed, and operated around the clock, the two motors just mentioned will consume electrical power of great value. The power consumption aspect is just as significant. Accordingly, the present disclosure sets forth an improved centrifuge system which is capable of providing the desired or optimum separation. This is done with a simplified system reducing the number of electric motors from two to one, and this is done with a system which is able to accomplish optimum operation. Optimum operation is denoted by adjustment to the proper speeds. The system of this disclosure has advantages which derive from simplification. A single motor starter and associated electrical power circuit is needed, not two. Moreover, the system enables adjustment to the desired speed difference to prompt the conveyor to rotate at the correct or desired speed.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
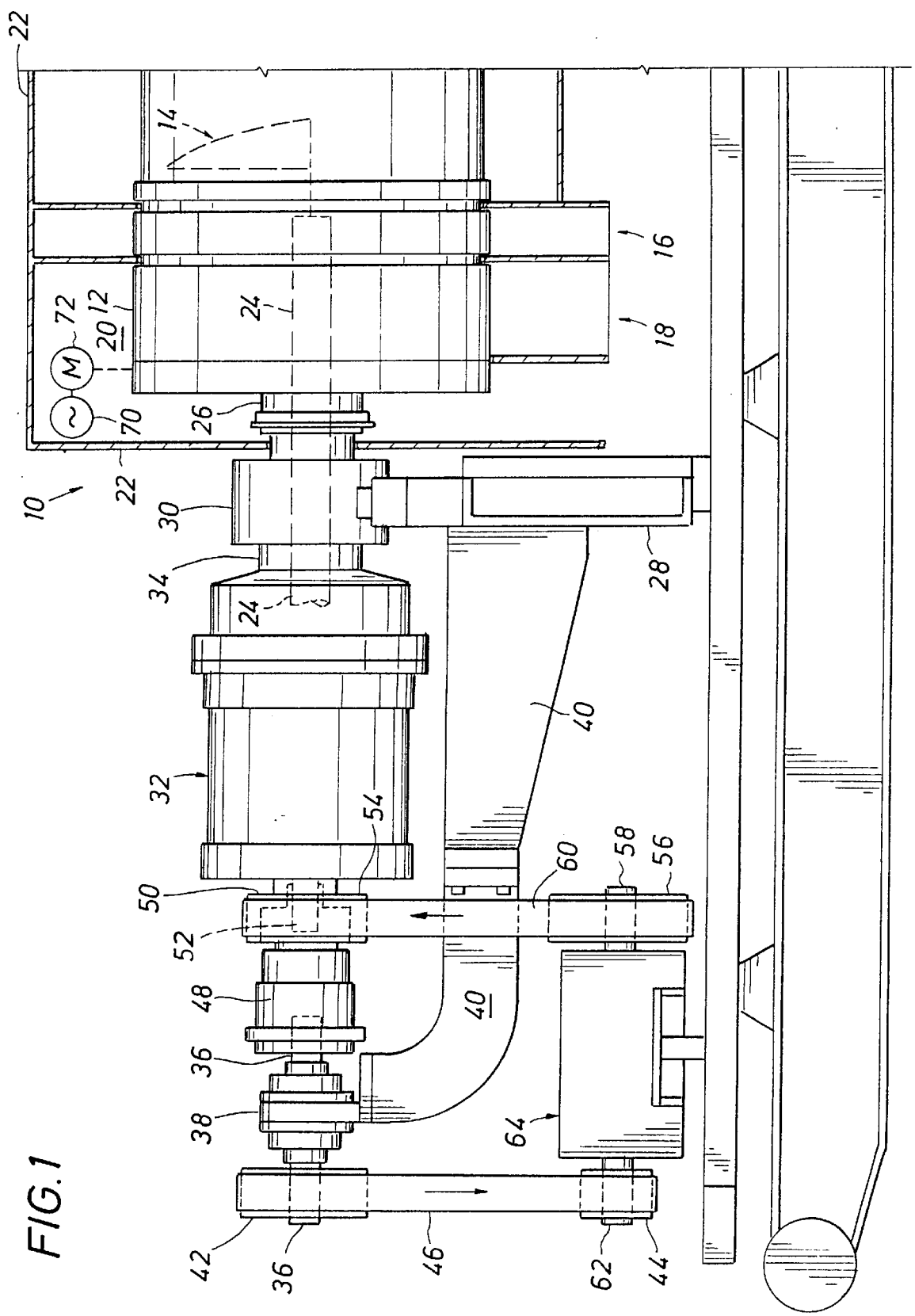
FIG. 1 is a side view showing the apparatus of the present disclosure installed to operate a conveyor bowl and conveyor in accordance with the teachings of this disclosure, to thereby simplify the equipment complexity and to obtain a desired level of control over centrifuge operation.

Attention is directed to FIG. 1 of the drawings which shows a centrifuge 10 having a rotating bowl 12. A separable slurry is separated by migration under the urging of the conveyor 14 where the heavier components are moved to the left as noted. Alternatively, the system can be used to separate oil from water. Under the assumption that the water is heavier, the water will be forced to the outlet end 18 and the lighter oil components will be received from the opening 16. In general terms, the heavier material is moved to the far left while the lighter of the two materials is moved to the central portions and emerges from the opening 16. These openings 16 and 18 are defined in part by the fixed nonrotating housing 22 which is around the rotating bowl 12. The shell or housing is a fixed structure which serves as a splash guard, coincidentally, and which includes internal partitions so that the two discharge flows are segregated and delivered as needed.

The system is driven by two separate drive shafts which deliver power to the driven components. One is shown in dotted line and is the shaft 24 on the interior. It connects with the conveyor 14. The second power transfer shaft is the surrounding sleeve 26 concentric to the shaft 24. The two rotating, separate, drive shafts are driven separately. While denoted here as shafts, and claimed as "shafts", axially coincident shafts have the form of aligned and concentric sleeves in the assembly. Yet, while separately operated and separately powered, they derive their power from a common source, as will be set forth. While that is true, they still operate at different speeds so that there is a differential thereby prompting the scrolling action which moves the segregated heavier components to the far left and leaves the lighter components from the slurry for evacuation from the outlet 16. Briefly, a flow of some slurry is introduced at the far right hand end and is segregated for emergence at the two outlets 16 and 18.

In general terms, the far right hand end of the centrifuge 20 is provided with a fluid inlet which delivers the necessary slurry flow. In addition, a large electric motor (shown in symbolic form) is connected by simple belt drive to the bowl 12 for rotation. The bowl is brought up to some speed and is maintained at that speed. This can be done readily with a single motor with a single speed control. The single motor and single speed control are adjusted to the desired speed. This establishes a first operative condition. The first operative condition includes at least specification of the bowl speed. If the speed is established, then the centrifugal forces acting on the slurry to be separated are in part created by and determined by the speed, the duration of operation, the time through put from the inlet to the outlet, diameter of the bowl and other factors.

Power Drive System

The centrifuge 20 is supported to the right of the upstanding fixed post 28 which supports a bearing assembly (not shown) within the pillow block 30. The pillow block 30 aligns the shaft and sleeve to the right so that the rotated mass (the bowl and its contents) is appropriately aligned. The pillow block 30 lines up the equipment to the left. This equipment includes a gearbox 32 which is a closed chamber. The gearbox has two outputs, one being the external sleeve 34 which is aligned with the sleeve 26 and which imparts rotation to it. The other output includes the shaft 24 which is extended through the pillow block and into the gearbox. Rotating two shafts is supplied from the gearbox. More will be noted concerning the relative speeds and direction of rotation. Suffice it to say, the gearbox is provided with input rotation at a specified speed. The gearbox at the lefthand end is supported on a shaft 36 which extends through a pillow block 38 resting on an upstanding post 40. The post 40 is axially aligned with the upstanding brace or support 28 previously mentioned. The post 40 supports the pillow block 38 to enable the shaft 36 to extend to the left hand end where the shaft 36 is engaged with a pulley 42. The pulley 42 is aligned with a lower pulley 44. The pulleys 42 and 44 are engaged with a flexible belt drive 46. The upstanding post 40 is curved, extending upwardly and to the left as illustrated in the drawing. The upstanding post 40 extends out from the support post 28. That enables the entire set of equipment to be anchored on some sort of base or other underlying structure. The frame member holds the pillow block 38 as mentioned. It is raised and aligned with the center line axis of all the rotating equipment.

Starting now from the far left hand end of the drawing, and going in particular to the shaft 36, that shaft again is shown extending at the far left where the pulley 42 is attached to it. The shaft passes through the pillow block 38. It then connects with a torque limiting coupling 48. The coupling 48 is constructed with an internal overriding slip clutch which is adjusted to a specified torque. At torque levels up to that, it will permit no slippage. When the loading exceeds the set level, it will decouple. This is a safety feature. When the torque coupling 48 slips, it avoids overloading the system at that occasion. Otherwise, at torque levels below the setting, continued operation is maintained so that the power transfer through the coupling 48 is continued.

The torque coupling 48 connects with a shaft extending from the end of the gearbox 32. The gearbox has two outputs at the right hand side which are the shaft 24 and the sleeve 34. At the left hand end, the gearbox again is provided with an input sleeve 50 which is drawn in solid line and an internal hidden shaft 52. They rotate at different speeds as will be explained. The sleeve 50 supports the pulley 54 which is aligned above a cooperative pulley 56. That pulley is mounted on a shaft 58. The shaft 58 is input to a gearbox 64. The gearbox 64 has a left hand shaft 62, and it is axially aligned with the shaft 58 at the other end. The pulley 56 is aligned with the pulley 54 and they are driven by a belt 60. Observe that there are directional arrows on the belts 46 and 60. They are driven in opposite directions. The significance of this will be given below.

Figure 2:
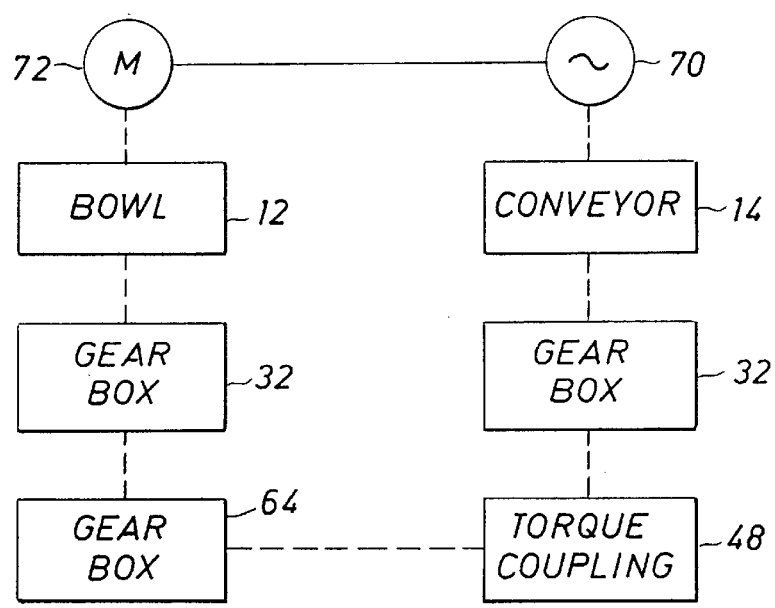
FIG. 2 is a flow chart of connected equipment.

To best understand the transfer of power and the operation of the present invention using essentially one prime mover, not two, better understanding will be obtained by review of the flow chart which is shown in FIG. 2. After that, the curves in FIGS. 3 and 4 will be reviewed. Going first to FIG. 2, the symbol 70 identifies a power source which is adjustable. It is adjustable either in voltage or frequency or current as appropriate to control the motor 72. The motor is responsive to the adjustments made. Typically, this represents a 3-phase system typically 220 VAC or even 440 VAC. As desired, an adjustment is made in the power furnished to the motor to change the motor output. The motor is typically adjusted in speed. The motor is connected to the bowl 12 which is rotated at a specified velocity. The motor 72 turns the bowl 12 (see FIG. 1) which in turn connects output rotation through the sleeve 26, then to the sleeve 34, and to the rotating gearbox 32 which will be described in some detail below. Continuing, the gearbox 32 shown in FIG. 2 forms an output drive which is conveyed to the second gearbox 64. This is a reversing gearbox. It has a 1:1 ratio so that the input rpm is equal to the output rpm with a change in direction. The output accomplishes the direction reversal. Going back to FIG. 1, the gearbox 64 is shown installed between the belt drives. The arrows marked on the belts indicate the reversal in direction.

The gearbox 64 provides rotation in the reversed direction to the torque coupling 48 which limits the transfer of torque. If the torque is in an acceptable range, then it is simply transferred to the coupling 48. If not, disconnection is made to prevent overloading the equipment. The torque coupling 48 provides rotation input to the gearbox 32 again. Discussion below will explain this transfer of motion (also a transfer of power) through the gearbox 32. The gearbox, in turn, is connected through the shaft 24 and rotates the conveyor 14. Power flows in the above described sequence. Power is consumed by the bowl 12 and the conveyor 14. These two devices are driven in a certain relationship as will detailed.

Figure 3:
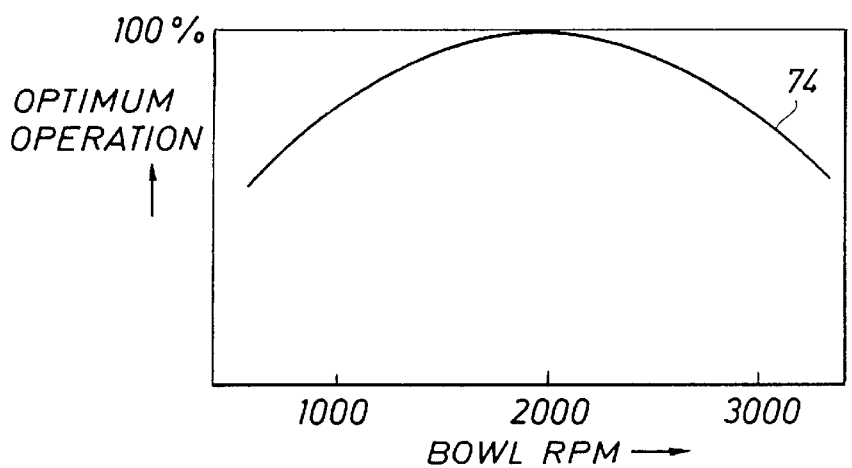
FIGS. 3 and 4 are performance curves.

Going momentarily to FIG. 3 of the drawings, the motor 72 is operated at an adjustable speed over a specified range. An arbitrary range has been selected and represented in FIG.

3. This range encompasses speeds of up to about 3,000 rpm. Dependent of a number of factors exemplified below, the motor 72 is operated at a selected speed by adjustment of the motor controller 70. That speed, not categorically known for a given situation, is adjusted over a range to find the optimum performance speed. In part, this relates to the relative rpm of the bowl. As the bowl becomes faster, the gravity forces applied by centrifugal operation to the heavy particles increases. For a given speed and given depth of pond of liquid in the bowl 12, a change in speed of necessity brings about a change in the pull on the heavier particles. It can be operated to provide forces of up to about 1,000 g's, and can even be increased to about 3,000 g's. In the latter instance, that usually involves a relatively large diameter bowl and operation at a high rate of speed. FIG. 3 suggests that optimum operation is not achieved at the fastest speed; rather, optimum operation is dependent on a number of physical parameters relating to the slurry introduced into the bow, and the degree of separation required for the circumstance. Accordingly, the curve 74 illustrated in FIG. 3 may differ for a different feed. It may move to the left or to the right, and the Q of the curve may vary. In other words, the curve can be very broad or become quite narrow. Without specifics for the moment, curve shape conveying the optimum operation of the system is typically graphed for a given feed. As the feed is processed through the centrifuge, the changes in bowl speed are appropriately noted.

Figure 4:
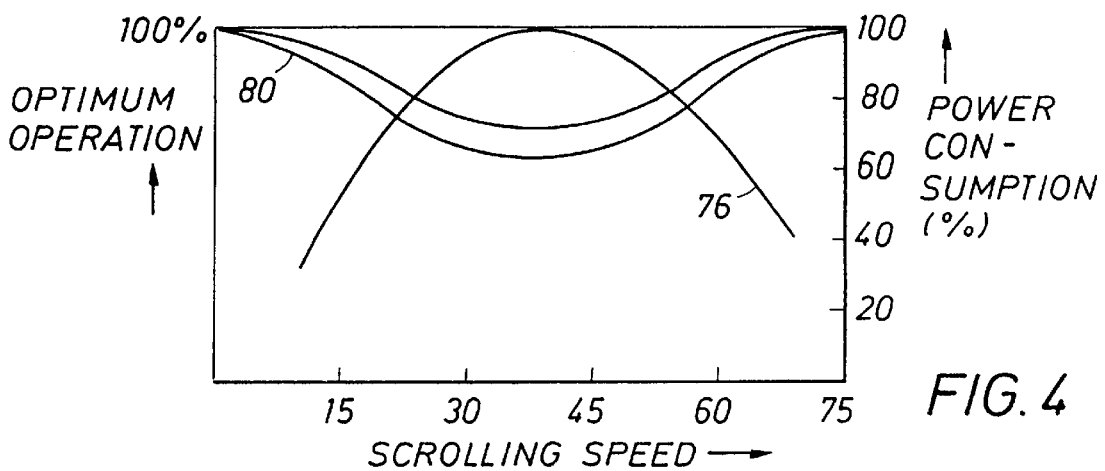

FIG. 4 shows two other aspects of this operation. Again, and dependent on the description of the feed, the system has an optimum operation. Obviously, if the conveyor moves at the same speed of the bowl, there is no output and the operation is not optimal at all. To that end, the scrolling speed is increased through a range. Eventually, it improves optimum performance, approaching the best, and then falls away. A representative curve for this is shown at 76. The performance curve 76 shows that there is a desired scrolling speed. Typically, it can be in the range of about 5 to about 100 rpm, and with the products discussed below, it is typically more in the range of about 45 to about 60. As always, that is a moving target depending on the specific physical parameters of the two materials in the slurry that are separated by operation of the centrifuge 10.

One important feature of the present invention is illustrated in FIG. 4 by a family of curves at 80. These represent the power consumption. Interestingly, as optimum operation improves by selection of the proper scrolling speed, the power required for operation decrease. By placing a watt meter on the power provided to the motor 72 from the power source 70, the power consumption for a given load can be measured. Accordingly, as the separation improves with choosing a correct scrolling differential speed, the power consumption will change. As the region of optimum operation is approached, the power typically will decrease. The amount of decrease may vary dependent on the nature of the slurry that is being treated. However, it is important to note that the decrease in power consumption is a result of optimal operation.

The curve 80, and more accurately one of a family of curves, is obtained primarily by obtaining the optimum separation. For instance, the flow into the centrifuge may be increased. Conventional wisdom would suggest that the bowl be speeded up to accommodate the increase. Perhaps that would be true, but not always. In addition, conventional wisdom would suggest that the scrolling speed be adjusted to a greater differential to get the heavy materials out of the bowl more rapidly. While there may be a superficial truth to that, there is the other problem that cannot be overcome, namely the dwell time of the particles being separated must be permitted to increase if that is necessary to obtain the desired separation. Otherwise, the scrolling speed can be increased significantly and yet an inferior separation would then be obtained. By increasing the scrolling speed, the dwell time is reduced and may be reduced so much so that it is not possible to let the heavier particles settle. When that condition exists, the separation will be significantly incomplete and inefficiency will evidence misoperation of the equipment.

With some of the foregoing examples in view, and returning now to FIG. 1 of the drawings, the bowl 12 is powered by the motor 72 which is connected with it through a typical belt drive. As power is imparted to the bowl 12, it is transferred to the sleeve 26, and that in turn transfers rotation to the sleeve 34. That is input to the gearbox 32.

Operation of the two gearboxes should now be noted. Consider first the simple gearbox 64. It is typically simply two gears which are equal in diameter. The first drives the second to provide a directional reversal. This is all that is accomplished in the gearbox 64. The gearbox 32 is more complicated. Preferably, it is a planetary gear system. In the preferred embodiment, a series of three planetary gear transmissions is typically used. The last is provided to merely form a phase reversal. In other words, it has a 1:1 throughput and simply reverses the direction of rotation. The other two planetary gears connected serially in the gearbox 32 provide a ratio. To consider a representative situation the gearbox 32 is a planetary gear system having a ratio in it of 1:53. With the bowl rotated at 2,000 rpm, the gearbox will provide a differential output of 2,000 divided by 53, or a differential speed of 37.74 rpm. This enables the conveyor to operate at a differential of 37.74 rpm. Looking then at FIG. 3, in that particular feed situation, the curve shows how the optimal operation is obtained at about 2,000 rpm. Again, while that may be true for one feed in a given separation situation, it may not be universally true. Going now to FIG. 4 of the drawings, the curve 76 is adjusted to obtain the optimum differential. The gearbox 32 is constructed with a fixed ratio as mentioned so that 2,000 rpm corresponds to 37.74 rpm. In this instance, the conveyor operates at a relative speed of 37.74 to clear out the heaviest particles in the material being treated. In this instance, the gearbox 32 provides a fixed ratio. If the velocity of the motor is increased from 2,000 to 3,000 rpm, then the differential speed will become proportionately larger or will increase by 18.84 rpm. This would provide a differential speed of 56.58 rpm. Obviously, the gearbox can be built with different ratios. Going back now to the flow of power and focusing on the direction of motion, the sleeve 26 is rotated in a particular direction, and that rotates the sleeve 34 in a particular direction, and that imparts rotation in the same direction to the gearbox 32. This enables the sleeve 50, at the left hand end of the gearbox 32, to rotate in the same direction at the same speed. That transfers the motion (and implicitly transfers the torque) through the 1:1 gearbox 64. This forms the reversal in direction. The direction reversal is useful and is coupled back through the torque coupling 48 and to the input shaft 52. This extends to the interior of the gearbox 32, and provides output motion to the drive shaft 24 which extends to the conveyor flite 14. Motion (hence torque or power) has been transferred in the fashion described in FIG. 2 along the path just discussed through the equipment of FIG. 1. Operation in this way is beneficial to the system so that adjustments can be made.

Easy adjustments are obtained merely by changing motor speed. Sometimes, the ratio in the gearbox 32 needs to be changed. That can be done by substitution of a different set of planetary gears. Interestingly, by tuning these ratios and by adjusting motor speed, operation of the equipment can be brought to an all together better operative mode with reduced power consumption, reduced capital cost, and longer life in the equipment. Moreover, a simplified operation is accomplished.

While the foregoing is directed to preferred embodiment, the scope thereof is determined by the claims which follow:

1. A centrifuge system comprising:
   (a) a drive rotating at a controlled speed;
   (b) a centrifuge bowl rotated with the drive;
   (c) an internally located screw conveyor in said bowl cooperatively rotating therewith wherein said screw conveyor and said bowl provide a scrolling action to help segregate heavier parts of a mixed fluid flow separated in said bowl and screw conveyor;
   (d) an output power transmission connected to first and second rotatable elongate connective shafts wherein said first connective shaft is connected to and driven by said bowl and said second connective shaft is connected to said screw conveyor, and wherein said output power transmission drives said screw conveyor to enable said screw conveyor to be rotated;
   (e) wherein said bowl speed is adjustable and said output power transmission cooperatively responds to impart a desired scrolling speed to said conveyor to operatively segregate said heavier parts, wherein said drive speed and cooperative output power transmission control bowl rotation and conveyor scrolling speed for optimum operation; and
   (f) wherein said output power transmission comprises first and second separately located gearboxes, each of the first and second separately located gearboxes defining an output, and wherein said second gearbox provides a rotation reversal, and wherein said first gearbox has a gear ratio forming a speed differential at the output thereof wherein the first gearbox output comprises said first and second connective shafts.

2. The system of claim 1 wherein said bowl internally receives a fluid of mixed parts which differ in density and the fluid introduced therein is segregated to scroll the denser parts to one end thereof, and said first and second connective shafts are concentric and are supported on a fixed frame to position bowl of said centrifuge system, and wherein said support frame connects with said output power transmission to align said output power transmission with said first and second rotatable elongate connective shafts connected with said bowl and conveyor.

3. The system of claim 1 wherein a support aligns said output power transmission with the centrifuge bowl and the internally located screw conveyor therein and wherein said output power transmission comprises a speed differential transmission rotating said bowl and said screw conveyor in a common direction with a scrolling speed differential in speed thereof.

4. The system of claim 1 wherein said first gearbox has a pair of input shafts connected thereto.

5. The system of claim 1 including only one motor.

6. The system of claim 1 wherein said first and second rotatable elongate connective shafts are concentrically arranged.

7. The system of claim 6 including a motor rotating said bowl, and said output power transmission transfers rotational power to said conveyor to provide said scrolling action.

8. The system of claim 7 including a motor speed controller.

9. A centrifuge drive system for controlling a scrolling action of a centrifuge comprising:
   (a) a centrifuge bowl adapted to be rotated;
   (b) an internally located screw conveyor in said bowl cooperatively rotating therewith wherein said screw conveyor and said bowl rotate with scrolling action to segregate heavier parts of a mixed fluid separated within said bowl by the scrolling action;
   (c) a bowl drive shaft connected to and adapted to be driven by said bowl to rotate therewith, the bowl drive shaft defining an axis;
   (d) a screw conveyor drive shaft connected to and adapted to drive said screw conveyor to rotate therewith, the screw conveyor drive shaft being coaxial with the bowl drive shaft; and
   (e) a transmission connected to said bowl and screw conveyor drive shafts, said transmission including a fixed ration to thereby control relative rotational speed of said conveyor within said bowl for scrolling, said transmission comprising first and second separately located gearboxes, each of the first and second separately located gearboxes defining and output, and wherein said second gearbox provides a rotation reversal, and wherein said first gearbox has a gear ratio forming a speed differential at the output thereof wherein the first gearbox output comprises said bowl and screw conveyor drive shafts.

10. The system of claim 9 wherein said first gearbox mounts in line to said bowl.

11. The system of claim 9 including:
    (a) an upstanding support;
    (b) a bearing assembly supporting said bowl for rotation with said bowl connected drive shaft;
    (c) an in-line connection between said bowl connected drive shaft and said first gearbox; and
    (d) a motor connected to rotate said bowl wherein said transmission is connected to both said bowl and said conveyor to rotate said conveyor.

12. The system of claim 11 wherein said transmission includes:
    (a) two rotational input members connected to said first gearbox; and
    (b) a motor connected to at least rotate said bowl directly and said conveyor through said transmission.

13. The system of claim 12 wherein said transmission has two rotational members connected to said second gearbox to rotate in opposite directions.

14. The system of claim 13 wherein said transmission rotational members connected to said second gearbox are arranged in-line.

15. The system of claim 14 wherein said transmission rotational members connected to the rotational reversal gear assembly are concentrically positioned.

16. The system of claim 15 wherein said two rotational input members are a solid shaft and a surrounding sleeve.

17. The system of claim 15 wherein said screw conveyor and bowl drive shafts are a solid shaft and a surrounding sleeve.

* * * * *